United States Patent Office 3,398,804
Patented Aug. 27, 1968

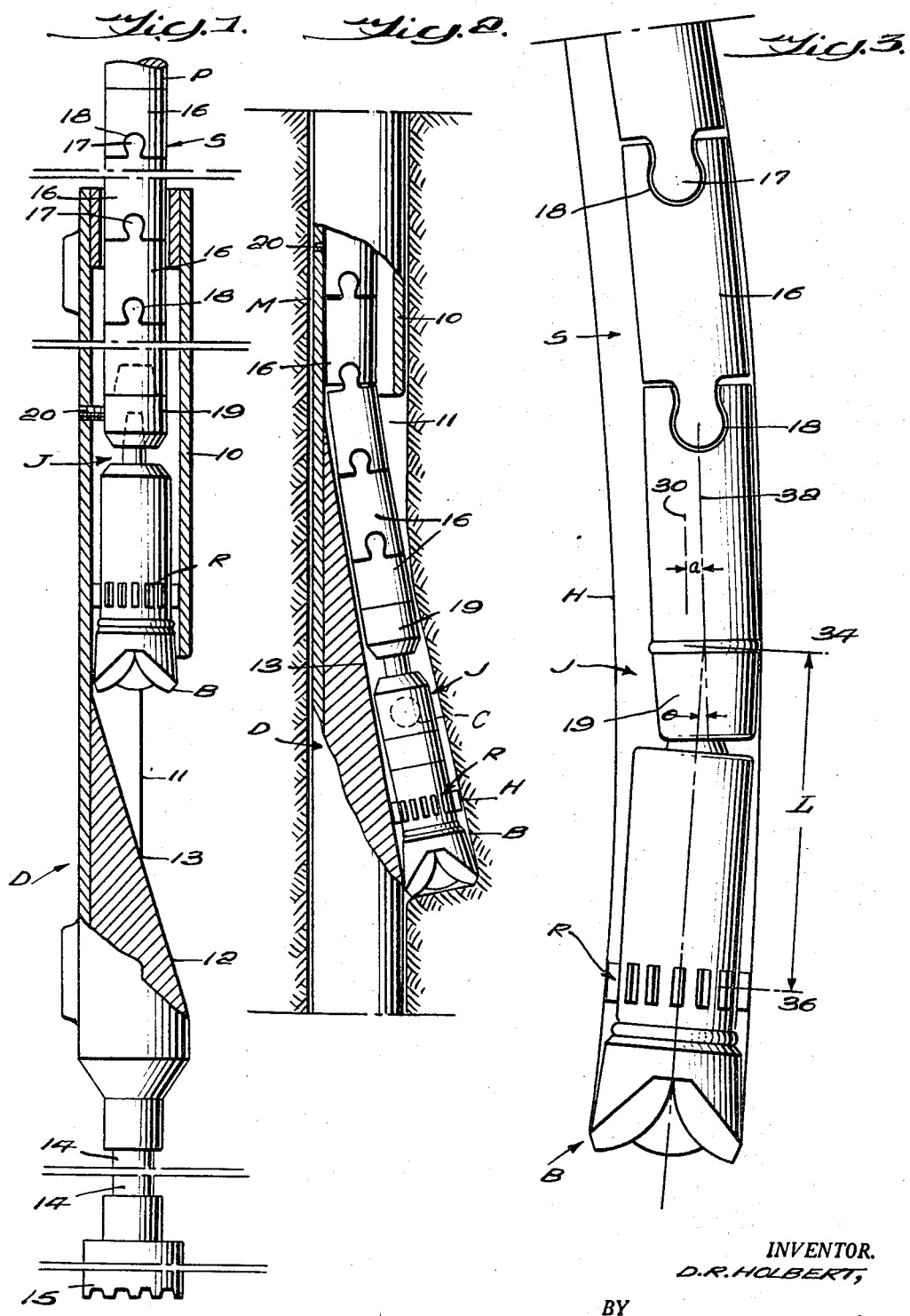

3,398,804
METHOD OF DRILLING A CURVED BORE
Don R. Holbert, Huntington Beach, Calif., assignor, by mesne assignments, to Sinclair Research, Inc., New York, N.Y., a corporation of Delaware
Filed Oct. 8, 1965, Ser. No. 493,970
3 Claims. (Cl. 175—61)

ABSTRACT OF THE DISCLOSURE

A method for drilling a curved bore with a predetermined radius of curvature from a main bore. The drilling apparatus, comprising a drill bit, a reamer having a diameter larger than the drill bit, a universal joint, and a rotatable flexible drill shaft, is deflected in the initial direction of the curved bore, and the curved bore is drilled. The universal joint and the reamer are selected so that the predetermined radius of curvature of the curved bore is given by $RC = L^2/2a$, where RC is the predetermined radius of curvature, L is the distance between the universal joint pivotal axis and the center of the reamer, and $a$ is the distance between the centerline of the curved bore and the centerline of the universal joint.

---

This invention relates to the drilling of horizontal bores in the earth and more particularly to the drilling of horizontal bores outwardly from the main vertical bores of oil wells to increase oil production and for other purposes.

The drilling of lateral bores from a main bore at a high angle to the main bore to increase oil production is not a new procedure; however, to date, a method has not been available with which a horizontal bore can be drilled from the main bore with accuracy both as to the degree of deviation from vertical and as to the horizontal direction in which the bore is drilled. It is an object of this invention to provide a horizontal drilling method which can be used to drill a horizontal bore in a desired direction and at a desired angle with respect to the vertical without substantial deviation from the initial desired direction.

In general, the horizontal drilling method of this invention comprises use in combination of a deflecting tool which is positioned in the main bore at the location, e.g., the distance above the bottom of the main bore, at which the horizontal bore is desired and a drilling apparatus. The drilling apparatus used in combination with the deflecting tool to actually effect drilling of the horizontal bore comprises several structures all of which are attached to the lower end of the usual drill pipe including a flexible shaft, a universal joint, a reamer and a drill bit which are connected together. The flexible shaft may be of any suitable construction which will permit the shaft to follow a drill bit into a horizontal hole which is being drilled outwardly from the main bore, and yet, be capable of transmitting torque to the drill bit.

In accordance with this invention, it has been found that in order to be able to drill a horizontal bore in a desired direction and maintain this direction as desired in the instant invention the bit-reamer-knuckle joint configuration must have a specific relationship. The hole drilled in producing the horizontal bore, i.e., in going from vertical to horizontal, is slightly elliptical in cross-section and is actually curved. The angle building capacity of the tool describes the radius of curvature of the centerline of this hole, i.e., 5° per foot of angle build gives a radius of curvature of about 11.5 feet or, in other words, with a 5° per foot of angle build the bore will go from vertical to horizontal through a curve having a radius of curvature of 11.5 feet. For a given radius of curvature RC, the knuckle joint to reamer spacing L and drilled hole centerline to knuckle joint centerline spacing $a$ must be in accordance with the following equation: $RC = L^2/2a$. L is measured from the centerline of the knuckle joint to the centerline of the reamer, both in the plane of contact to the drilled bore hole, and $a$ is the distance between the centerline of the reamed hole to the centerline of the knuckle joint. Also, the reamer must cut, i.e., effectively ream the bore, in order for the designed angle building capability to be developed.

In general, the size of the reamer will vary from that sufficient to cut or ream the bore and prevent stabilization of the bit to that size at which the reamer requires so much force to cut that the axial applied load on the drilling apparatus is insufficient to drill the bore. A ⅛ inch cut by the reamer is preferred. If the reamer does not cut, the reamer becomes a stabilizer, lifting the knuckle joint toward the centerline of the hole, reducing dimension $a$ in the above equation and increasing dimension L. Furthermore, since the axial applied load used in drilling the bore provides the moment causing the reamer to dig down and the bit to dig up, if the axial load is diminished from friction or less applied drill collar weight, the force against the reamer may fall below a threshold value causing it to stabilize and not cut. The speed of cutting, speed of penetration, also affects the reaming. Accordingly, the applied drilling weight, and the speed of cut, must be sufficient to get the reamer to cut effectively. For a 5°/ft. of angle build configuration of the bit-reamer-knuckle joint, the force against the reamer is about 50 percent of the axial load.

A blade reamer is preferred in the present invention although a spiral or other type can be used. The type of drill bit used may be determined by the rock being drilled in accordance with standard considerations. The applied drilling weight required in accordance with this invention is a function of the rock being drilled, i.e., is that amount sufficient to make the reamer cut in the particular rock being drilled. In general, the applied weight is in excess of about 4000 pounds. Soft sandstone, for example, may require a drilling weight in excess of about 4,000 lbs., oil shale in excess of about 7,000 lbs., and hard limestone rock in excess of about 8,000 lbs., etc.

The present invention is a method of drilling a curved bore having a predetermined substantially uniform radius of curvature from a main bore. The curved bore is drilled with an apparatus comprising a deflecting tool for determining the initial direction of the curved bore, a drill bit, a reamer having a diameter larger than the drill bit, a rotatable flexible drill pipe having a diameter less than the drill bit, a universal joint connecting the reamer to the drill pipe. The apparatus is selected such that the radius of curvature RC is given by the equation $RC = L^2/2a$, wherein L is the distance between the pivotal axis of the universal joint and the center of the reamer and $a$ is the distance between the centerline of the curved bore and the centerline of the universal joint.

The radius of curvature will be chosen as desired and put into the formula described above to ascertain the dimensions of the equipment. In general, the diameter of the knuckle joint will be the variable dimension to provide a given angle building capacity. A change in the diameter of the knuckle joint changes the dimension *a* measured from the centerline of the bore to that of the knuckle joint. A smaller radius of curvature is preferred because the directional characteristics desired are better achieved with a small radius of curvature. The radius of curvature is generally spoken of in terms of the desired angle of build and may vary from about 2° per foot to about 6° per foot with approximately 5° per foot as a preferred angle of build. The upper limit for the angle of build is determined by the flexibility and strength of the flexible shaft being used. Too high an angle of build may generate torque in such an amount as to twist off, i.e., shear, the pipe. With a 5° per foot angle of build the radius of curvature is approximately 11.5 feet and with a 2° angle of build the radius of curvature is approximately 28 feet. A further important consideration in the present invention is the selection of the drilling fluid to be used in the drilling operation. The drilling fluid is preferably close in consistency and composition to water and contains an extreme pressure agent in an amount sufficient to coat the pipe. Usually the drilling fluid will also include an emulsifier.

With the horizontal drilling method of the present invention, it is possible to drill horizontal bores accurately in a desired direction to distances in excess of about 100 feet horizontally outward from the main bore. If the torque required to be applied to the pipe exceeds the load limit of the pipe, however, the pipe will shear.

The deflecting tool used in combination with the drilling apparatus in the practice of this invention is commonly called a whipstock and ideally should have the same radius of curvature R along its length as defined above which is the radius of curvature of the curve through which it is desired for the flexible pipe to pass in going from a vertical to a horizontal bore. The whipstock in general should have a radius of curvature or an angle with respect to the vertical of at least 5°, and up to about 20°, preferably at least 10 to 12° up to about 15 to 18° depending upon the length of the whipstock. It is preferably, if the radius of curvature is not the same as R described above, to have the whipstock angle slightly higher than the desired angle which determines the radius of curvature R.

Other objects of this invention will become apparent from the following description taken in connection with the accompanying drawings in which:

FIGURE 1 is a longitudinal cross-sectional view of drilling apparatus utilized in the practice of this invention, the horizontal drilling apparatus being shown associated with a deflecting tool and conditioned for placing in a main well bore prior to the beginning of drilling operations to make a horizontal bore;

FIGURE 2 is a side view of a part of a main earth bore showing horizontal drilling apparatus being employed to drill a lateral bore;

FIGURE 3 is a drawing of the bit-reamer-kunckle joint configuration illustrating the required dimensions.

Referring to the drawings in detail and first to FIGURE 1, there is shown a drilling structure for drilling horizontal bores from a main well bore, which structure embodies this invention. These horizontal bores are drilled after the main bore is drilled into the oil-bearing strata. The horizontal bores may be drilled from the main bore at or near any depth of the main bore and the direction there of may be at any point of the compass. In some cases the angle with respect to the axis of the main bore will be in excess of 90°. The horizontal bores reach points a considerable distance, e.g., on the order of 100 feet or more, in a generally horizontal direction from the main bore.

As shown in FIGURE 1, there is provided a deflecting tool, generally designated as D, which has a tubular upper end 10 and a window 11 at its lower end. Mounted in the lower end of the tubular member opposite the window is a plug portion 12 provided with a surface 13 angularly positioned with respect to the longitudinal axis of the deflecting tool, which surface is ordinarily called the deflecting surface. Surface 13 is opposite the window 11 so that the drilling bit can be deflected toward a direction which is at an angle to the axis of the tubular part of the deflecting tool. A tail pipe 14 is secured at the lower end of the deflecting tool. Tail pipe 14 has an anchor 15 at its lower end, the purpose of which is to anchor the deflecting tool D in the main bore and at the desired distance above the bottom of the main bore. The length of the tail pipe 14 will be selected so that when the anchor member 15 is on the bottom of the main bore, the deflecting surface 13 will be at the point in the main bore where it is desired to begin drilling of the lateral bore.

The horizontal drilling apparatus which embodies this invention comprises in combination with the deflecting tool D several structures which are attached to the lower end of the usual drill pipe P including a flexible shaft or pipe S, a knuckle or universal joint J, a reamer R and a drill bit B, connected together as shown. The flexible shaft S may be of any suitable construction which will permit the shaft to follow a drill bit into a horizontal hole which is being drilled laterally from the main bore and yet be capable of transmitting torque to the drill bit. The particular shaft shown comprises a number of tubular sections 16 joined together by means of interengaging lobes 17 and sockets 18.

The universal or knuckle joint J is mounted in the drilling structure at the lower end of the flexible shaft S and forms a connecting joint C between this shafting and the drill bit B together with the reamer R which is attached at the rear of the drill bit. The joint J provides a universal connection and is so constructed that drilling torque can be transferred from the flexible shafting to the drilling bit to accomplish drilling operations. Such universal joints are well known in the art and further description is believed unnecessary. To attach the upper end of the joint structure J to the lower end of the flexible shafting S there is provided a tapered sub 19, see FIGURE 3. The drill bit B, already referred to, may be of any suitable construction such as the rock type having rotary cutting members as shown. The reamer R which is located directly behind the drilling bit B follows the drilling bit as it cuts the lateral or horizontal bore and reams out the cut bore.

Before inserting the horizontal drilling apparatus just described into the well bore to perform the drilling of the lateral bore, the deflecting tool will be connected to the drilling bit and flexible shafting so that the relationship thereof will be known. This is accomplished by means of a frangible pin 20 arranged between the tubular part 10 of the deflecting tool and the sub 19 above the joint J. The position of the pin will be such as to hold the bit B slightly above the deflecting surface of the deflecting tool, as shown in FIGURE 1. With this connection, the whole drilling structure shown in FIGURE 1 will then be lowered into the main bore, generally indicated by M, see FIGURE 2. It will be noted that the structure will be arranged so that the anchor 15 will rest on and press into the bottom of the main bore M. The distance that the deflecting tool is above this bottom will depend upon the length of the tail pipe 14. Before placing the anchor 15 on the bottom of the main bore M, the deflecting surface 13 of the deflecting tool D will be oriented, that is, placed in the direction and at the position it is desired to drill off from the main bore to produce the horizontal bore which in FIGURE 2 is indicated by the letter H. The orienting of the deflecting surface on the deflecting tool is accomplished by conventional methods well known to one skilled in the art and when such is done the anchor will then be placed on the bottom of the main bore where the teeth thereof will dig into the bottom surface and prevent rotation of the deflecting tool relative to the bore.

Drilling operations can now be commenced and these are begun by first applying a downward pressure on the drill pipe P, which will result in severing the frangible pin 20 and disconnection of the drilling structure from the deflecting tool. As the drill pipe P is rotated, the drill bit B will also be rotated, and upon continued lowering of the drill pipe the drill bit will be deflected by the deflecting surface 13 through the window 11 of the deflecting tool and the drilling bit will then begin to cut a hole off from the side of the main bore and in a direction as determined by the angle of the deflecting surface. The beginning of the cutting of the lateral bore from the main bore is shown in FIGURE 2, wherein the frangible pin 20 is shown severed and the bit B in a position where it has been deflected off from deflecting surface 13 and has begun cutting a bore. Due to the fact that the diameter of the members of the joint J is less than the drill bit B, the joint, when acted upon by downward forces present during drilling, will be pushed over toward the deflecting surface 13 of the deflecting tool D. Consequently, this tendency of the joint to move toward the deflecting surface will result in the placing of the axis of the drilling bit B and also the coinciding axis of the reamer R to be at a slight angle to the deflecting surface.

Thus, as soon as drilling bit B reaches a point where it is passing off from the deflecting surface, the bit will tend to dig toward the top side of the bore being drilled and, as a result, the bore will be drilled in a curve, i.e., at an angle to the vertical, and not in a straight line or substantially straight line. This is referred to as "building" angle. If there were no tendency of the drilling bit to build angle as a result of the structure employed, the bore would be drilled in a straight direction substantially the same as that of the deflecting surface as extended, and the axis of the lateral bore would always maintain an angular relation with the main bore which would be substantially the same as the deflection surface. However, with the improved drilling construction of this invention embodying the universal joint J having a particular relationship with the reamer R both as to diameter and spacing, the axis of the drilling bit will be at a slight angle to a line tangent to the lateral bore at a point where the drilling bit is cutting, and this angle will be such as to direct the drilling bit toward the high side of the lateral bore as drilling continues. As the drilling bit is rotated and the angle continues to "build," the bore cut will have a curvature which will have a substantially uniform radius of curvature. If the lateral bore is continued to be drilled outwardly, it will reach a horizontal direction with respect to the main bore which is assumed to be vertical. During all the drilling, fluid can be circulated through the flexible shafting S, joint J and reamer R to the drill bit B. If necessary, the flexible shafting can be lined with a suitable rubber tubing to prevent leakage at the joints.

After the desired length of lateral hole is drilled, the flexible shafting and other drilling structure can be pulled back into the deflecting tool and then the whole structure removed from the bottom of the main bore, or if it is desired to drill additional drain holes off from the main bore, the deflecting tool can be raised off the bottom of the main bore and after turning the drill pipe to a new oriented position it can be again lowered and a lateral bore drilled off in another direction, which will be determined by the direction of the deflecting surface of the deflecting tool.

FIGURE 3 illustrates the required relationship between the reamer R and the joint J. This specific relationship is one of the distance L between the pivotal axis of the joint J at 34 and centerline 36 of the reamer R and of the difference $a$ between the radius of the joint J and the radius of the reamed hole H, i.e., the distance between the centerline 30 of the hole H and the centerline 32 of the shaft S. This specific relationship of dimensions is critical to accomplish the desired drilling of the horizontal bore through building of angle and to accomplish control, i.e., maintenance in the direction of horizontal drilling. The radius of curvature, represented as the angle $\theta$, see FIGURE 3, of the bore drilled is given by the equation $L^2/2a$ and will be uniform once drilling is begun. If the curvature of the bore is allowed to get off course, i.e., if the bore is drilled in the wrong direction, the curvature is irreversible. In general, an angle of build, i.e., a radius of curvature is chosen for the drilling apparatus and from this the desired dimensions are chosen. Since the knuckle joint must be smaller than the drill bit and in general has a diameter equal to the flexible shaft S, the dimension $a$ is also relatively inflexible such that in constructing the apparatus in accordance with this invention the dimension L is of primary importance. The reamer R must not only ream out the bore H, but must cut to develop the designed and required angle building capability of the drilling apparatus. This cut is preferably approximately ⅛ inch, although in general the amount may be only that sufficient to prevent the reamer from acting as a stabilizer and straightening out the flexible shafting S. The upper limit of cut is determined by the amount of cutting which would apply too great torque load to the shafting S and tear the shafting apart.

As a specific example of this invention, two horizontal bores were drilled in a limestone quarry. The general procedure was to drill about 16 ft. of straight 6″ diameter hole for placement of the deflecting tool which was oriented visually. One 10 ft. joint of flush joint sheath pipe was run above the deflecting tool and allowed to stick out slightly above the ground. Drilling was done with a small truck-mounted shot-hole rig. The rig was equipped with hold-down chains making it possible to put a maximum of 7500 lbs. of truck weight on the kelley.

A first straight hole was drilled and a deflecting tool having a 14° deflecting surface and a sheath pipe were set. Horizontal drilling was begun using a multi-bladed carbide insert reamer having a diameter substantially equal to the drill bit. The results are summarized in Table I.

TABLE I

| Drilling Mud | Drilling Weight, lbs. | Depth, ft. | Penetration Rate, ft./min. | Survey, deg. | Rate of Angle Build, deg./ft. | Direction |
|---|---|---|---|---|---|---|
| Water | 600 | 13.5 | .02 | 4 | (¹) | N. 32° E. |
| Do | 600 | 16.5 | .02 | 9 | (¹) | S. 19° E. |
| Do | 600 | 20.9 | .02 | 28½ | 2.6 | S. 10° W. |
| Do | 600 | 21.1 | .02 | 26½ | 2.4 | S. 6° W. |
| Do | 6,150 | 30.9 | .1 | 40½ | 1.4 | S. 50° W. |
| Do | 6,150 | 31.1 | .1 | 40½ | 1.4 | S. 51° W. |
| Do | 6,400 | 36.1 | .1 | 36 | −.7 | S. 74° W. |

(Reamer bits badly broken.)

¹ Probably still in whipstock.

Angle build was maintained for two 10 ft. joints and then became negative. A second straight hole was drilled and the deflecting tool reset. The carbide insert reamer was replaced with a spiral three bladed design. The results are tabulated in Table II.

TABLE II

| Drilling Mud | Drilling Weight, lbs. | Depth, ft. | Penetration Rate, ft./min. | Survey, deg. | Rate of Angle Build, deg./ft. | Direction |
|---|---|---|---|---|---|---|
| Gauge Spiral Reamer | | | | | | |
| Water | 4,800 | 11.2 | .13 | | | |
| Do | 5,900 | 19.2 | .17 | 11 | 1.6 | S. 9° W. |
| Do | 5,900 | 21.2 | .17 | 15 | 2.0 | S. 3° W. |
| Do | 8,350 | 23.2 | .17 | 19½ | 2.0 | S. 26° W. |
| Do | 8,350 | 25.2 | .17 | 23½ | 2.0 | S. 30° W. |
| Do | 8,350 | 27.2 | .17 | 24 | .3 | S. 53° W. |
| Do | 8,350 | 29.2 | .17 | 25 | .5 | S. 64° W. |
| Do | 8,350 | 31.2 | .17 | 25½ | .3 | S. 69° W. |
| Do | 8,350 | 31.2 | .17 | 26 | .5 | S. 81° W. |
| Do | 8,600 | 33.2 | .17 | 25½ | 0 | N. 85° W. |
| Do | 8,600 | 35.2 | .18 | 23 | −1.3 | N. 88° W. |
| Do | 8,600 | 37.2 | .18 | 20 | −1.5 | S. 85° W. |
| Do | 8,600 | 39.2 | .18 | 16½ | −1.8 | N. 56° W. |
| Do | 8,600 | 40.7 | .18 | 14½ | −1.3 | N. 49° W. |
| (O-ring fitting at top of hose unscrewed and hose collapsed.) | | | | | | |
| Overgauge Blade Reamer | | | | | | |
| Water | 8,100 | 21.0 | .2 | 26½ | 2.7 | N. 37° E. |
| Do | 8,350 | 31.0 | .2 | 44 | 1.8 | N. 67° E. |
| Do | 8,600 | 41.0 | .14 | 66½ | 2.3 | N. 87° E. |
| Do | 8,850 | 50.2 | .13 | 88 | 2.3 | N. 76° E. |
| (Drill stem turning very hard.) | | | | | | |

Even with maximum truck weight on the bit and reamer it appeared that the spiral reamer was unable to cut satisfactorily. Friction may have been a factor in diminishing axial load. The negative angle build strongly illustrates the influence of position on the bit-reamer-knuckle joint performance. Once allowed to cock in the wrong direction, the downward curvature is irreversible.

The deflecting tool was then turned and a new lateral initiated. A blade reamer was used with the carbide inserts being replaced with mild steel which was coated with carbide-bearing hard-facing material. The reamer was built overgauge. The satisfactory results obtained are shown in Table II. The reamer cut successfully at a moderate rate of angle build; however, a large amount of torque was required to turn the kelley at the end.

A third hole was drilled and the blade reamer was run with a 4° per foot design configuration in accordance with this invention. The top sub of the knuckle joint was partially tapered. The knuckle joint had an outside diameter of 4 inches. The blade reamer was replaced with a reworked spiral reamer after drilling one joint. A 4⅝" bit and a 4¾" reamer were run. The results, shown in Table III, indicate that the spiral reamer had poorer cutting characteristics. Further checking showed the top sub taper to be inadequate. The top sub of a knuckle joint with a 3½" O.D. was tapered and modified to give an exact 5° per foot angle building configuration, i.e., diameter at pin built up to 3.7" O.D. A second lateral was drilled with the new knuckle joint, a 4¾" bit and a 4⅞" reamer. As can be seen from Table III, the angle build dropped with depth. Much torque was required to turn the drill pipe indicating the high initial angle build was developing large amounts of friction.

TABLE III

| Drilling Mud | Drilling Weight, lbs. | Depth, ft. | Penetration Rate, ft./min. | Survey, deg. | Rate of Angle Build, deg./ft. | Direction |
|---|---|---|---|---|---|---|
| Overgauge Blade Reamer | | | | | | |
| Water | 8,100 | 22.4 | .17 | 32 | 3.2 | S. 36° W. |
| Overgauge Spiral Reamer | | | | | | |
| Water | 8,350 | 31.9 | .24 | 50 | 1.8 | S. 70° W. |
| Overgauge Blade Reamer with Small Knuckle Joint | | | | | | |
| Water | 8,100 | 21.8 | .18 | 41 | 4.1 | N. 43° E. |
| Do | 8,350 | 31.4 | .15 | 65 | 2.4 | E. |
| Do | 8,600 | 40.3 | .13 | 78 | 1.3 | S. 40° W. |

A fourth hole was drilled and horizontal drilling initated. An extreme pressure lubricant and emulsifier, i.e., Baroid's Trimulso and Mudlube in concentrations of 1 lb. and 4 lbs. per bbl., respectively, were added to the drilling fluid. These small quantities had significant effects in reducing friction. The 4⅞" bladed reamer was also resurfaced, reduced to 4¾" O.D. and reshaped to obtain a better cutting edge. A 4⅝" bit was used with the reworked multi-bladed reamer.

The results for the first lateral are shown in Table IV. One joint was drilled with the 4° per foot configuration. The angle build for the 5° per foot configuration was close to 10 percent of design. Penetration rate was markedly increased and the torque decreased for the maximum bit load condition. A 90° angle was turned in 34 feet. At 34 feet the reamer was replaced by a stabilizer. The stabilizer used was 4¾" O.D. It was necessary to ream the stabilizer down to bottom. Angle build in the stabilized section was much smaller, but still noticeable (.2° per foot).

TABLE IV

| Drilling Mud | Drilling Weight, lbs. | Depth, ft. | Penetration Rate, ft./min. | Survey, deg. | Rate of Angle Build, deg./ft. | Direction |
|---|---|---|---|---|---|---|
| Overgauge Blade Reamer, Tapered Knuckle Joints | | | | | | |
| Trimulso-Mudlube in water base: | | | | | | |
| 4°/ft. Configuration | 8,100 | 21.3 | .28 | 32½ | 3.3 | S. 38° W. |
| 5°/ft. Configuration | 8,350 | 31.1 | .32 | 76½ | 4.4 | S. 35° W. |
|  | 8,600 | 33.1 | .29 | 86½ | 5 | S. 34° W. |
| (Stabilizer on at 34.6'.) | | | | | | |
|  | 8,600 | 40.5 | .25 | 93 | | |
|  | 8,850 | 50.3 | .24 | 95 | .2 | |
| Overgauge Blade Reamer, Tapered Small Knuckle Joint, Reduced Weight Test | | | | | | |
| Trimulso-Mudlube in water base | 8,100 | 21.0 | .30 | 40 | 4.0 | N. 59° E. |
|  | 8,350 | 26.0 | .31 | 69 | 5.8 | N. 74° E. |
|  | 7,050 | 31.0 | .29 | 83½ | 2.9 | N. 80° E. |
|  | 8,600 | 32.0 | .25 | 88 | 4.5 | N. 79° E. |
|  | 7,300 | 39.8 | .24 | 95 | | |
|  | 7,550 | 49.7 | .22 | 97 | .2 | |
| (Hose connection unscrewed.) | | | | | | |

A second lateral was drilled in the fourth hole which included experimenting with bit load. The results are shown in Table IV. The reduction in bit load had a pronounced effect on angle build. Penetration rates were excellent. The 90° angle was turned in 32½ feet. An undergauge stabilizer was run at 33½ feet resulting again in a small angle build of .2° per foot.

During the operation surveys were made with an orienting instrument run in a modified case on a 100 foot sewer tape. Velocities in the 4¾" hole annulus were generally maintained above 200 feet per minute. At the last the pump rate was about 2 bbls. per minute. Rotary r.p.m. was between 40 and 70 r.p.m. The improved mud used in the fourth hole made it possible to run smoothly above 60 r.p.m.

It is claimed:

1. In a method of drilling a lateral curved bore from a main earth bore comprising lowering into the main bore a drilling structure attached to a drill pipe and including a drill bit, a reamer having a center and attached behind the drill bit and having a diameter larger than the drill bit, a rotatable flexible drill shaft connected to the drill pipe and having a diameter less than the drill bit, and a universal joint having a pivotal axis and connecting the reamer to the shaft and including means for transmitting rotatory movement from the drill shaft to the reamer, rotating said drilling structure while applying an axial load thereon, and deflecting said drilling structure to start the lateral bore, the improvement of a method for predetermining the radius of curvature of said lateral curved bore comprising selecting the length of said universal joint structure and said reamer and selecting the diameter of said reamer such that $RC=L^2/2a$ wherein RC is said predetermined uniform radius of curvature, L is the distance between said pivotal axis and said reamer center, and $a$ is the distance between the centerline of the curved bore and the centerline of the joint.

2. In a method of drilling a lateral curved bore from a main earth bore comprising lowering into the main bore a drilling structure attached to a drill pipe and including a flexible drill shaft, a universal joint structure, a reamer, and a drill bit which are connected together, rotating said drilling structure while applying an axial load thereon, and deflecting said drilling structure to start the lateral bore, the improvement of a method for drilling said lateral curved bore with a predetermined substantially uniform radius of curvature comprising deflecting said drilling structure in the desired direction, rotating said drilling structure to drill said lateral bore with said drill bit and reamer, said reamer cutting the lateral bore a sufficient amount to prevent stabilization of said drill bit, said joint structure having an overall diameter less than the drill bit and being positioned closely adjacent to the drill bit in accordance with the equation $RC=L^2/2a$ wherein RC is said predetermined radius of curvature, L is the distance measured from the centerline of said joint structure to the centerline of said reamer both in the plane of contact to the drilled lateral curved bore and $a$ is the distance between the centerline of the reamed lateral curved bore and the centerline of the joint structure, said flexible drill pipe also being of a diameter less than the drill bit whereby during drilling the drill bit can first be deflected in the desired direction from the main bore by the deflecting tool to start the lateral bore and thereafter the joint will be permitted by the dimensional relationship thereof to the reamer, the cutting of the reamer bit, and the size of the flexible drill pipe to be forced to the low side of the lateral bore being drilled and the bit will be directed continuously in said desired direction without substantial deviation and toward the high side of the bore bottom to thereby "build angle" and produce the curved bore.

3. The method of claim 2 wherein a drilling fluid containing an extreme pressure lubricant is circulated through said flexible drill shaft and around said drill bit during said drilling.

References Cited

UNITED STATES PATENTS

| 2,687,282 | 8/1954 | Sanders | 175—61 X |
| 2,726,847 | 12/1955 | McCune | 175—61 |
| 3,043,381 | 7/1962 | McNeely | 175—61 X |
| 3,116,799 | 1/1964 | Lemons | 175—61 |

NILE C. BYERS, JR., *Primary Examiner.*